United States Patent
Ebner et al.

(10) Patent No.: US 9,013,720 B2
(45) Date of Patent: Apr. 21, 2015

(54) RESOURCE SAVING WHILE AVOIDING CUSTOMER WAIT ANNOYANCE

(75) Inventors: Fritz F. Ebner, Pittsford, NY (US); Yves Hoppenot, Notre Dame de Message (FR); John A. Wright, Molalla, OR (US)

(73) Assignee: Xerox Corporation, Norwalk, CT (US)

( * ) Notice: Subject to any disclaimer, the term of this patent is extended or adjusted under 35 U.S.C. 154(b) by 119 days.

(21) Appl. No.: 13/252,312

(22) Filed: Oct. 4, 2011

(65) Prior Publication Data
US 2013/0083339 A1 Apr. 4, 2013

(51) Int. Cl.
*G06F 3/12* (2006.01)
*G06F 1/32* (2006.01)

(52) U.S. Cl.
CPC ............ *G06F 3/1203* (2013.01); *G06F 3/1221* (2013.01); *G06F 3/1231* (2013.01); *G06F 3/1257* (2013.01); *G06F 1/3284* (2013.01); *Y02B 60/1267* (2013.01)

(58) Field of Classification Search
CPC .. G03G 15/5058; G03G 21/00; G06F 3/1219; G06F 3/1222
See application file for complete search history.

(56) References Cited

U.S. PATENT DOCUMENTS

| | | | |
|---|---|---|---|
| 5,392,095 A | 2/1995 | Siegel | |
| 6,032,004 A | 2/2000 | Mirabella, Jr. et al. | |
| 6,072,585 A | 6/2000 | Dutton et al. | |
| 6,993,417 B2 | 1/2006 | Osann, Jr. | |
| 6,999,186 B2 * | 2/2006 | Utsunomiya | 358/1.13 |
| 7,743,267 B2 | 6/2010 | Snyder et al. | |
| 7,849,339 B2 | 12/2010 | Lee | |
| 2001/0012126 A1 * | 8/2001 | Mori | 358/434 |
| 2004/0108309 A1 | 6/2004 | Dempsey | |
| 2005/0195226 A1 * | 9/2005 | Takeishi et al. | 347/8 |
| 2005/0259276 A1 * | 11/2005 | Smith et al. | 358/1.9 |
| 2006/0181010 A1 * | 8/2006 | Okamoto et al. | 271/256 |
| 2006/0259803 A1 | 11/2006 | Edwards et al. | |

(Continued)

FOREIGN PATENT DOCUMENTS

CN 201262698 6/2009

OTHER PUBLICATIONS

Ciriza et al., U.S. Appl. No. 12/819,427, filed Jun. 21, 2010, System and Method Enabling an Environmentally Informed Printer Choice at Job Submission Time.

*Primary Examiner* — Fred Guillermety
*Assistant Examiner* — Idowu O Osifade
(74) *Attorney, Agent, or Firm* — Gibb & Riley, LLC

(57) ABSTRACT

Systems and methods receive user feedback during user interaction with at least one printing apparatus to record user annoyance measurements for one or more users into memory of at least one computerized device. The systems and methods automatically calculate one or more user annoyance curves for the users from the user annoyance measurements. The annoyance curves relate to one or more performance characteristics of the printing apparatus. The systems and methods automatically select a specific annoyance curve from the annoyance curves depending upon which of the users is utilizing the printing apparatus. The systems and methods automatically determine a performance characteristic level for the printing apparatus that will maintain user annoyance below a predetermined standard for each of the users using the specific annoyance curve for each user. The systems and methods automatically set components of the printing apparatus to operate so as to achieve the identified performance characteristic level.

16 Claims, 3 Drawing Sheets

(56) References Cited

U.S. PATENT DOCUMENTS

| | | |
|---|---|---|
| 2007/0297112 A1 | 12/2007 | Gilbert |
| 2008/0225326 A1* | 9/2008 | Kephart et al. ............. 358/1.15 |
| 2009/0138878 A1 | 5/2009 | Fernstrom et al. |
| 2009/0141302 A1* | 6/2009 | Balm et al. ................... 358/1.15 |
| 2010/0235664 A1 | 9/2010 | Karlsson |
| 2010/0262571 A1* | 10/2010 | Schmidtler et al. ............ 706/12 |
| 2010/0313048 A1 | 12/2010 | Shye et al. |
| 2010/0321724 A1* | 12/2010 | Paul et al. ................... 358/1.15 |

* cited by examiner

RESOURCE SAVING WHILE AVOIDING CUSTOMER WAIT ANNOYANCE

BACKGROUND

Embodiments herein generally relate to systems and methods that interactively obtained customer annoyance levels and that adjust device performance to keep customer annoyance below a predetermined level.

Many advances have been made with respect to utilizing less resources and consuming less power when operating machines, such as printing devices. However, such advances sometimes negatively impact the performance characteristics of the printing devices. For example, power saving routines that put the printing device into sleep states can cause the user a longer wait time while the machine recovers from the sleep state. When customers have to wait for service from a printing device it can cause annoyance. Some predetermined optimization methodologies attempt to balance the trades off of wait time and resource consumption. Such processes compare the performance losses against resource savings to find the best balance between such factors.

SUMMARY

An exemplary method herein receives user feedback during user interaction with at least one printing apparatus to record user irritation level feedback (that is referred to herein as "annoyance measurements") for one or more users into memory of at least one computerized device. For example, the method can provide questions relating to irritation level to a user, and receive responses to the questions from the user through a graphic user interface of the printing apparatus.

The method automatically calculates one or more user annoyance curves for the users from the user annoyance measurements. The user annoyance curve is a plot of annoyance levels for performance characteristics over time, and the curve is usually non-linear. The annoyance curves relate to different performance characteristics of the printing apparatus. Such performance characteristics can comprise, for example, warm-up times, printing speeds, data calculation speeds, etc.

The embodiments herein can maintain a wide range of annoyance curves. For example, the embodiments herein can produce simple 2-feature annoyance curves that plot each user's individual annoyance measurements over time for a single performance characteristic (such as User A's annoyance measurements for Warm-up Time) or the embodiments herein can produce complex multi-feature annoyance curves that plot multiple users' annoyance measurements over time for multiple performance characteristics. Further, the embodiments herein can produce any form of annoyance curve in between such examples.

In addition, different annoyance curves can be produced for the same user under different operating and environmental conditions, such as remote operation vs. walk-up printer operation, weekday vs. weekend, pre-established deadline times vs. non-deadline times, large print job vs. small print job, many individual print jobs vs. few individual print jobs, etc. Therefore, the embodiments can also record print job characteristics simultaneously with the annoyance measurements. The method can automatically select a specific annoyance curve from the multitude of annoyance curves depending upon which of the users is utilizing the printing apparatus and the operating and environmental conditions.

The method automatically determines a performance characteristic level for the printing apparatus that will maintain user annoyance below a predetermined standard for each of the users using the specific annoyance curve selected. Further, the method automatically sets components of the printing apparatus to operate so as to achieve the identified performance characteristic level.

An exemplary printing apparatus embodiment herein has: at least one printing engine operatively connected to (directly or indirectly connected to) a computerized device; at least one non-transitory storage device (operatively connected to the computerized device); a graphic user interface (operatively connected to the computerized device); etc. The graphic user interface receives user feedback during user interaction with the printing apparatus to record user annoyance measurements into the non-transitory storage device. The computerized device automatically calculates one or more user annoyance curves from the user annoyance measurements for one or more performance characteristics of the printing apparatus for one or more users. The computerized device automatically determines the performance characteristic level for the printing apparatus that will maintain user annoyance below a predetermined standard using the annoyance curves. The computerized device automatically sets components of the printing engine to operate so as to achieve the performance characteristic level.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

As mentioned above, some predetermined optimization methodologies attempt to balance the trades off of wait time and resource consumption; however, such routines do not take into account the different impact such waiting will have on different users. When customers have to wait for service from a printing device it can cause annoyance. This annoyance factor is not proportional to wait time, and can be characterized depending on customer type and user function. Instead of considering user annoyance levels, such conventional processes merely compare the performance losses against resource savings to find the best balance between such factors.

Therefore, the embodiments herein characterize annoyance by plotting annoyance as a function of wait time. Methods herein deduce customer annoyance and create relationships between wait time and annoyance factors, customized for each user. The embodiments herein then optimize the tradeoff between resource consumption and true customer annoyance. Further, customers can continually adjust their annoyance tolerance as feedback to the optimization to create a personalized optimization between annoyance and power savings.

Figure 1:
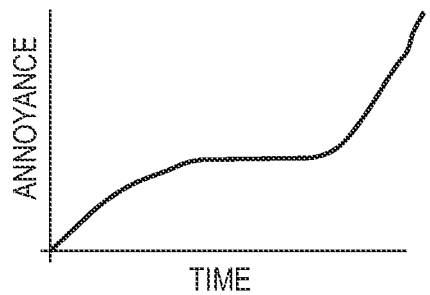
FIG. 1 is an exemplary annoyance curve according to embodiments herein.
Figure 2:
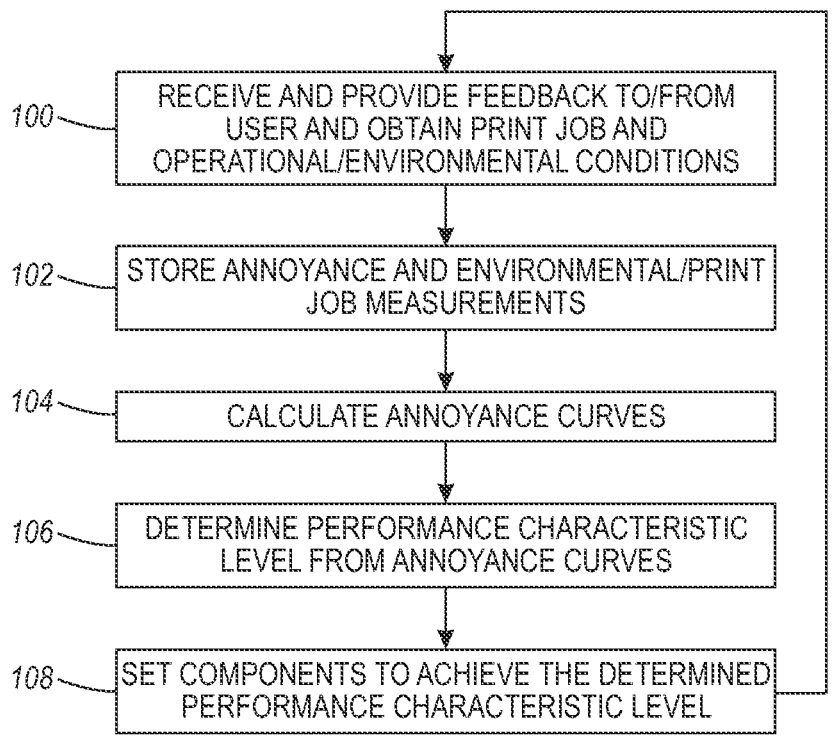
FIG. 2 is a flow diagram illustrating various method embodiments herein.

The annoyance curve in FIG. 1 shows a specific user's annoyance when waiting for a printing device to become ready. As shown in FIG. 1, the relationship between annoyance and wait time is non-linear. Many times the customer will tolerate waiting for a certain amount of time, then become more annoyed by waiting. This annoyance will then flatten out while they 'accept' their waiting until the wait becomes unbearable, and their annoyance rises dramatically. A basis function can be derived from a collection of customer data and direct observation. It can then be parameterized based on feedback and feed-forward mechanisms.

Optimization techniques in the past have been employed to minimize wait time for the customer and to minimize power consumption, but have not taken into account the annoyance transform that will affect the users' experience. Using the embodiments herein, the optimization techniques can optimize over a more representative value than time, which is the user's real frustration for having to wait until the operation is carried out.

Each annoyance curve is individual to each user and also depends on job function and aspects of a particular customer's jobs in a particular environment. Therefore, the methods and systems herein take annoyance in account in order to inform the user and to let them make the right decision (wait, forward, cancel . . . ).

The methods and systems herein address many issues to characterize and minimize customer wait annoyance. Several options exist to solve each part. More specifically, the embodiments herein measure or estimate the wait time due to device wake-up or busyness, or even raster image processing (RIP) slowness for complex jobs; estimate processing time, based on transition from sleep along with a variety of other aspects such as RIP speed vs. complexity; measure print job waiting time, based on waiting print sheet in output bin information (time between output and pick up); and measure user waiting time, based on a device proximity sensor information correlated with device activity (time waste in front of the device). The proximity sensor can be replaced by a mobile phone GPS information correlated with known device geolocalization.

Further, the methods and systems herein deduce the annoyance factor as a function of wait time, which was estimated above. For example, an individual user can be detected by the device activity record. In one example, the graphic user interface can present a post-survey: "Did you wait too long?" This can be asked of the user through the print driver or a desktop widget such as a personal assessment tool. Similarly, a pre-survey can be presented through the print driver, such as: "You will have to wait 15 s, is it too long?" Further, feedback can be presented on the graphic user interface of the printing device itself when the print job is released, such as: "Was it long to wait for this print?" or "From 1 to 5, how annoyed were you?" Additional relevant feedback can include, for example when two similar devices are available: one with faster process, but further away; and the other with slower process, but physically closer to the user. The user is presented with the choice, and the embodiments herein track whether the user prefers to go further or wait longer?

In addition, these methods and systems are able to classify wait times and annoyance factors for a variety of job attributes. For example, walk-up jobs (copy) may have greater annoyance than remote jobs (print) for the same warm-up time, smaller jobs may have greater annoyance than larger jobs for the same warm-up time, short intervals between jobs (job inter-arrival time) may have greater annoyance than long intervals for the same warm-up time, etc. Further, multiple attributes can be simultaneously considered.

Finally, the embodiments herein use annoyance curves and individual annoyance factors to provide an optimal solution customized to each user (given their current environmental and operational conditions). Thus, the systems and methods herein find a good balance between low resource consumption and acceptable user annoyance. This is done through optimization against weighted annoyance factor and power consumption. More specifically, the systems and methods herein find a good balance between print cost and acceptable user annoyance. This is done through optimization against weighted annoyance factors and print price estimation. The embodiments herein find a good balance between user device distance and acceptable user annoyance. This is done through optimization against weighted annoyance factor and user-device distance estimation.

With these methods and systems, devices in the local domain can be queried to see annoyance curve and estimate annoyance for a specific print job. If the estimated annoyance for the default printer is too high, the print job can be redirected to another device with lower estimated annoyance. The annoyance analysis transforms time to be linear in annoyance, and a threshold can be used which limits the annoyance for waiting. The systems herein can also deduce badly set devices according to their average activity and surrounding user's expectation in a day to day life of a management fleet process.

The mechanisms herein can be implemented for an individual device, multiple devices simultaneously in a networked environment, or generalized from historic data and applied to any device in a fixed method where one or more feedback mechanisms are not available (such as where a particular customer opts out of giving pre- or post-survey data). In any implementation, the mechanisms herein adaptively wake-up and wake-down to optimize the tradeoff between wait annoyance and resource consumption, while giving the customer control over their own preference to either more or less annoyance.

In some implementations, the methods and systems herein can perform various distinct operations, such as gathering annoyance data, calculating annoyance curves, and optimizing machine performance and resource utilization based upon the annoyance curves to produce a transfer function. The transfer function is then used to set up the printing device so that it is optimized for a given user's annoyance characteristics.

However, the embodiments herein do not require all such processing for every situation. For example, if it is difficult or undesirable to gather the annoyance data, historical annoyance data (from other machines, other users, etc.) can be utilized to provide generic annoyance optimization standards that are set while the printing machines are being manufactured. This way, no burden is placed upon the consumer to establish annoyance data. After the user has set up the printing device, the user can be provided with an option to begin gathering annoyance data, at which time the generic annoyance optimization standards can be modified/replaced with annoyance optimization standards specific to an individual user. Similarly, if a user found the process of gathering data to not be worthwhile, the user can be provided with an option to stop gathering annoyance data.

Those ordinarily skilled in the art would understand that less than all of the features described herein can be utilized in order to accommodate specific implementations. Further, some features may be utilized periodically (or only initially) while other features can be used continuously.

An exemplary method herein receives user feedback during user interaction with at least one printing apparatus in item 100 to record user irritation level feedback (that is referred to herein as "annoyance measurements") for one or more users into memory of at least one computerized device in item 102. For example, the method can provide questions relating to irritation level to a user, and receive responses to the questions from the user through a graphic user interface of the printing apparatus or a remote computerize device.

In item 104, the method automatically calculates one or more user annoyance curves for the users from the user annoyance measurements. The user annoyance curve is a plot of annoyance levels for performance characteristics over time, and the curve is usually different for different users and non-linear. The annoyance curves relate to different performance characteristics of the printing apparatus. Such performance characteristics can comprise, for example, warm-up times, printing speeds, data calculation speeds, etc.

The embodiments herein can maintain a wide range of annoyance curves, eliminating the need to obtain user feedback at each usage. For example, the embodiments herein can produce simple 2-feature annoyance curves that plot each user's individual annoyance measurements over time for a single performance characteristic (such as User A's annoyance measurements vs. Warm-up Time) or the embodiments herein can produce complex multi-feature annoyance curves that plot multiple users' annoyance measurements over time for multiple performance characteristics. Further, the embodiments herein can produce any form of annoyance curve in between such examples.

In addition, different annoyance curves can be produced for the same user under different operating and environmental conditions, such as remote operation vs. walk-up printer operation, weekday vs. weekend, pre-established deadline times vs. non-deadline times, large print job vs. small print job, many individual print jobs vs. few individual print jobs, etc. Therefore, the embodiments can also record print job characteristics simultaneously with the annoyance measurements in item 100. In item 106, this exemplary method can automatically select a specific annoyance curve from the multitude of annoyance curves depending upon which of the users is utilizing the printing apparatus and the current operating and environmental conditions.

The method then automatically determines a performance characteristic level for the printing apparatus that will maintain user annoyance below a predetermined standard for each of the users using the specific annoyance curve selected in item 106. Further, the method automatically sets components of the printing apparatus to operate so as to achieve the identified performance characteristic level in item 108, and processing returns to item 100 to provide additional feedback to the user, obtain additional feedback from the user, etc.

Figure 3:
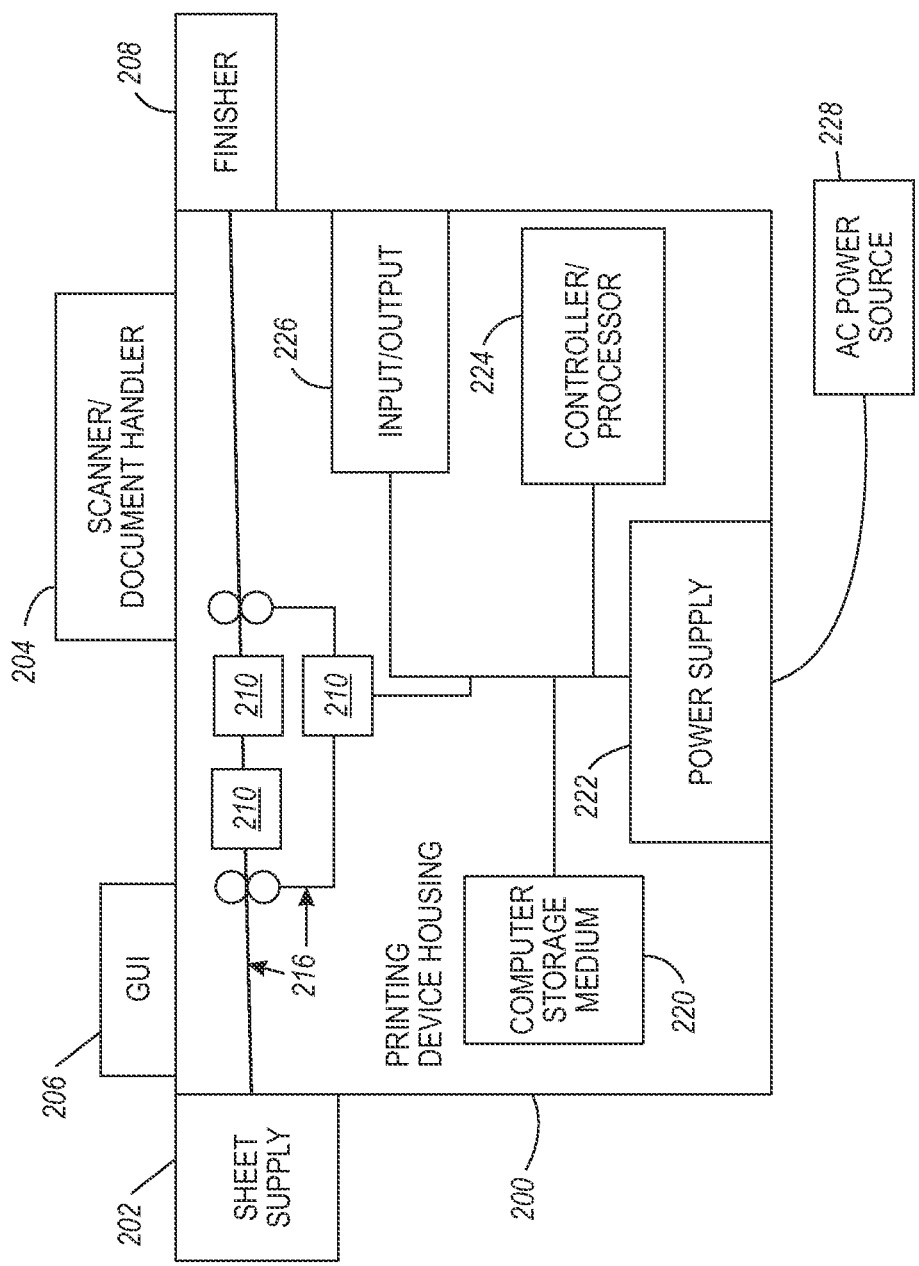
FIG. 3 is a side-view schematic diagram of a device according to embodiments herein.

FIG. 3 illustrates a computerized printing device 300, which can be used with embodiments herein and can comprise, for example, a printer, copier, multi-function machine, etc. The printing device 200 includes a controller/processor 224, at least one marking device (printing engines) 210 operatively connected to the processor 224, a media path 216 positioned to supply sheets of media from a sheet supply 202 to the marking device(s) 210 and a communications port (input/output) 226 operatively connected to the processor 224 and to a computerized network external to the printing device. After receiving various markings from the printing engine(s), the sheets of media can optionally pass to a finisher 208 which can fold, staple, sort, etc., the various printed sheets.

Also, the printing device 200 can include at least one accessory functional component (such as a scanner/document handler 204, sheet supply 202, finisher 208, etc.) and graphic user interface assembly 206 that also operate on the power supplied from the external power source 228 (through the power supply 222).

The input/output device 226 is used for communications to and from the multi-function printing device 200. The processor 224 controls the various actions of the printing device. A non-transitory computer storage medium device 220 (which can be optical, magnetic, capacitor based, etc.) is readable by the processor 224 and stores instructions that the processor 224 executes to allow the multi-function printing device to perform its various functions, such as those described herein.

Thus, a printer body housing 200 has one or more functional components that operate on power supplied from the alternating current (AC) 228 by the power supply 222. The power supply 222 connects to an external alternating current power source 228 and converts the external power into the type of power needed by the various components.

As would be understood by those ordinarily skilled in the art, the printing device 200 shown in FIG. 3 is only one example and the embodiments herein are equally applicable to other types of printing devices that may include fewer components or more components. For example, while a limited number of printing engines and paper paths are illustrated in FIG. 3, those ordinarily skilled in the art would understand that many more paper paths and additional printing engines could be included within any printing device used with embodiments herein.

In such a computerized (printing) device 200, the graphic user interface 206 receives user feedback during user interaction with the printing apparatus 200 to record user annoyance measurements into the non-transitory storage device. The computerized device 224 automatically calculates one or more user annoyance curves from the user annoyance measurements for one or more performance characteristics of the printing apparatus for one or more users. The computerized device 224 automatically determines the performance characteristic level for the printing apparatus 200 that will maintain user annoyance below a predetermined standard using the annoyance curves. The computerized device 200 automatically sets components 202, 204, 206, 208, 210, 216, 220, 222, 224, 226, etc. of the printing engine to operate so as to achieve the identified performance characteristic level.

Figure 4:
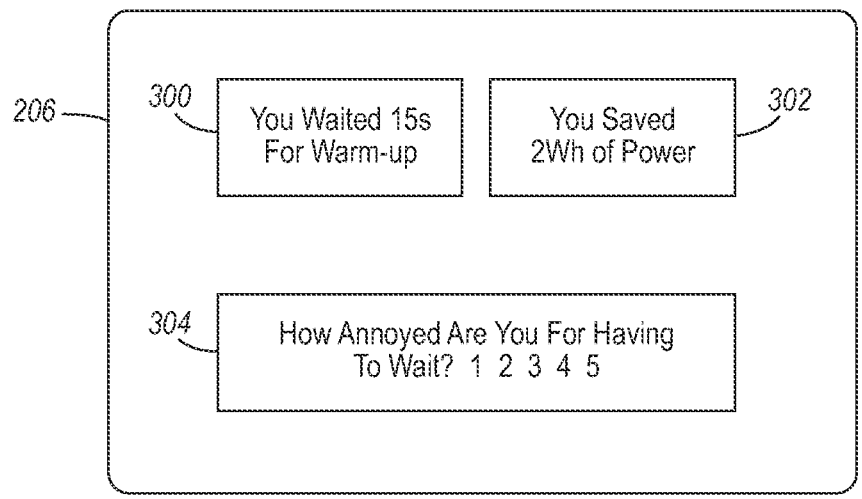
FIG. 4 is a schematic diagram of a graphic user interface display according to embodiments herein.

FIG. 4 illustrates an exemplary screen shot of some of the feedback provided to and obtained from the user through the graphic user interface 206. More specifically, item 300 displays to the user the amount of time they had to wait and the performance characteristic associated with the wait time. In item 302, feedback is provided to the user regarding how much power the wait saved. In item 304, a question is presented to the user regarding their annoyance level and, when the user selects one of the answers (1-5), the user provides feedback that is used as an annoyance measurement.

The graphic interface 206 shown in FIG. 4 could be located on the printing device 200 or on a remote computing device operated by the user. Further, the feedback shown in items 300 and 302 could comprise any of the forms of feedback discussed above, including recommending alternative printing machines, describing different reasons for the wait, etc.

Figure 5:
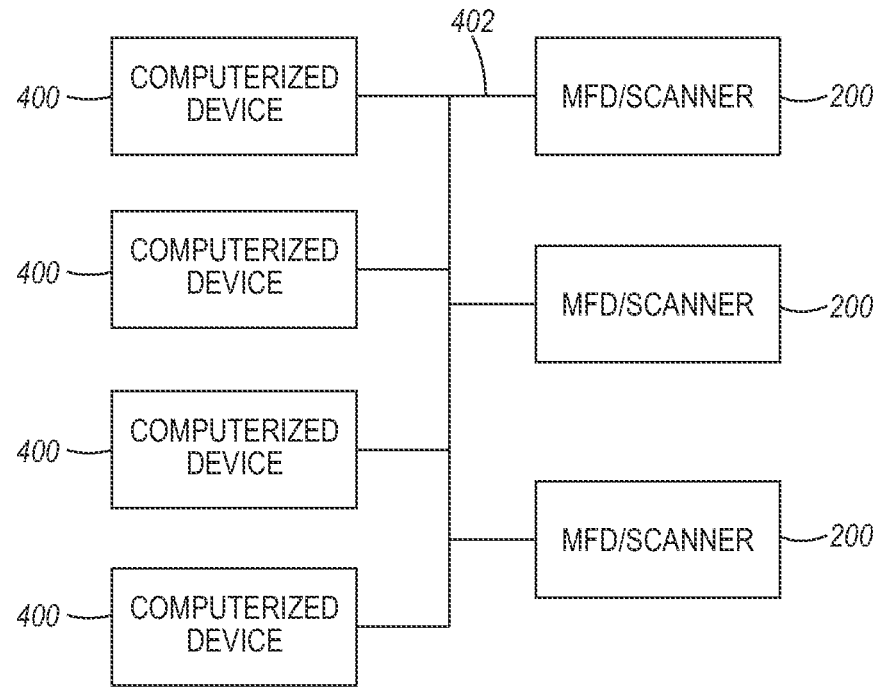
FIG. 5 is a schematic diagram of a system according to embodiments herein.

In an exemplary diagram shown in FIG. 5, a plurality of such scanning/printing devices 200 are connected to a plurality of remote computerized devices 400 by way of a local or wide area network 402. In an exemplary workflow, a user would submit one or more print jobs to one of the printing devices 200 (either through one of the remote computerized devices 400 or to one of the printing devices 200 in a walk-up manner). The printing device 200, or one of the computerized devices 400 (which could be acting as a centralized server) can provide feedback advice to the user regarding how long the wait will be, and what other options are available to the user (if annoyance curves are available for that user) through the most appropriate graphic user interface.

In addition, when the print job is submitted, the environmental/operating conditions and the nature of the print job are recorded by the printing device 200 or the computerized device 400. As mentioned above, these conditions can include remote operation vs. walk-up printer operation, weekday vs. weekend, pre-established deadline times vs. non-deadline times, large print job vs. small print job, many individual print jobs vs. few individual print jobs, etc.

The computerized device 400 and/or printing device 200 keep track of the delay and the operating characteristics associated with the delay, and obtain annoyance feedback from the user during and/or after the print job has completed. As mentioned above, this feedback is used to establish the annoyance curves, which are used to set up each different printing device 200 to keep the user's experience with each print job within predetermined annoyance standards.

The annoyance curves can average multiple users experiences (such as groups of users) to provide more generic annoyance curves. Similarly, the annoyance curves can relate to a single characteristic (such as power savings, toner savings, particle emission reduction, etc.) to establish individual user (or group) annoyance preferences and trade-offs for such characteristics. Alternatively, multiple ones of such characteristics can be grouped together in a category such as environmentally friendly "green" processing to establish user or group trade-off preferences (to establish how much annoyance a user or group of users is willing to endure in order to perform printing operations that conserve resources and reduce pollution). In other words, the annoyance curves can be utilized to select very specific printing component operating characteristics to match a specific situation for a specific user; and can also be used within any wider spectrum that groups users together, groups operating/environmental conditions, groups operating characteristics, etc. Thus, the systems and methods described herein are very flexible and are applicable to a wide range of user annoyances, and a wide range of operating characteristics.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein cannot be implied or imported from any above example as limitations to any particular order, number, position, size, shape, angle, color, or material.

What is claimed is:

1. A method comprising:
    receiving, into a computerized device from a user, user irritation level feedback caused by user wait time for a printing apparatus to operate during user interaction with said printing apparatus to measure user annoyance levels related to said user wait time;
    automatically recording said user annoyance levels as related to said user wait time into memory of said computerized device;
    automatically calculating user annoyance curves based on said annoyance levels and said user wait time using said computerized device, each of said user annoyance curves comprising a plot of said user annoyance levels over said user wait time;
    automatically determining a performance characteristic level for said printing apparatus that will maintain user annoyance below a predetermined standard using said annoyance curves, using said computerized device; and
    automatically setting components of said printing apparatus to operate so as to achieve said performance characteristic level, using said computerized device.

2. The method according to claim 1, said receiving user irritation level feedback comprising providing questions to at least one user, and comprising receiving responses to said questions from said user through a graphic user interface of said printing apparatus.

3. The method according to claim 1, said user annoyance curve being non-linear.

4. The method according to claim 1, said user annoyance curves being for performance characteristics comprising warm-up times, printing speeds, and data calculation speeds.

5. A method comprising:
    receiving, into a computerized device from a plurality of users, user irritation level feedback caused by user wait time for at least one printing apparatus to operate during user interaction with said printing apparatus to measure user annoyance levels related to said user wait time for said plurality of users;

automatically recording said user annoyance levels as related to said user wait time into memory of said computerized device;

automatically calculating one or more user annoyance curves for each of said users based on said annoyance levels and said user wait time using said computerized device, each of said user annoyance curves comprising a plot of said user annoyance levels over said user wait time;

automatically selecting a specific annoyance curve from said annoyance curves depending upon which of said users is utilizing said printing apparatus, using said computerized device;

automatically determining a performance characteristic level for said printing apparatus that will maintain user annoyance below a predetermined standard for each of said users using said specific annoyance curve, using said computerized device; and automatically setting components of said printing apparatus to operate so as to achieve said performance characteristic level, using said computerized device.

6. The method according to claim 5, said receiving irritation level feedback comprising providing questions to at least one user, and comprising receiving responses to said questions from said user through a graphic user interface of said printing apparatus.

7. The method according to claim 5, said user annoyance curve being non-linear.

8. The method according to claim 5, said user annoyance curves being for performance characteristics comprising warm-up times, printing speeds, and data calculation speeds.

9. A method comprising:

receiving, into a computerized device from a user, user irritation level feedback caused by user wait time for a printing apparatus to operate during user interaction with said printing apparatus to measure user annoyance levels related to said user wait time;

automatically recording print job characteristics simultaneously with said user annoyance levels as related to said user wait time into memory of computerized device;

automatically calculating one or more user annoyance curves based on said annoyance levels and said user wait time for said print job characteristics using said computerized device, each of said user annoyance curves comprising a plot of said user annoyance levels over said user wait time;

automatically determining a performance characteristic level for said printing apparatus that will maintain user annoyance below a predetermined standard using said annoyance curves, using said computerized device; and automatically setting components of said printing apparatus to operate so as to achieve said performance characteristic level, using said computerized device.

10. The method according to claim 9, said receiving irritation level feedback comprising providing questions to at least one user, and comprising receiving responses to said questions from said user through a graphic user interface of said printing apparatus.

11. The method according to claim 9, said user annoyance curve being non-linear.

12. The method according to claim 9, said user annoyance curves being for performance characteristics comprising warm-up times, printing speeds, and data calculation speeds.

13. A printing apparatus comprising:

at least one computerized device;

at least one printing engine operatively connected to said computerized device;

at least one non-transitory storage device operatively connected to said computerized device; and a graphic user interface operatively connected to said computerized device, said graphic user interface receiving user irritation level feedback from a user caused by user wait time for said printing apparatus to operate during user interaction with said printing apparatus to measure user annoyance levels related to said user wait time, said non-transitory storage device automatically recording said user annoyance levels as related to said user wait time, said computerized device automatically calculating one or more user annoyance curves based on said annoyance levels and said user wait time, each of said user annoyance curves comprising a plot of said user annoyance levels over said user wait time, said computerized device automatically determining a performance characteristic level for said printing apparatus that will maintain user annoyance below a predetermined standard using said annoyance curves, and said computerized device automatically setting components of said printing engine to operate so as to achieve said performance characteristic level.

14. The printing apparatus according to claim 13, said graphic user interface receiving said user irritation level feedback by providing questions to at least one user, and receiving responses to said questions from said user.

15. The printing apparatus according to claim 13, said user annoyance curve being non-linear.

16. The printing apparatus according to claim 13, said user annoyance curves being for performance characteristics comprising warm-up times, printing speeds, and data calculation speeds.

* * * * *